(12) United States Patent
Khorram et al.

(10) Patent No.: US 12,315,499 B2
(45) Date of Patent: May 27, 2025

(54) SEMI-SUPERVISED TRAINING SCHEME FOR SPEECH RECOGNITION

(71) Applicant: Google LLC, Mountain View, CA (US)

(72) Inventors: Soheil Khorram, Redwood City, CA (US); Anshuman Tripathi, Mountain View, CA (US); Kim Jaeyoung, Cupertino, CA (US); Han Lu, Redmond, WA (US); Qian Zhang, Mountain View, CA (US); Hasim Sak, Santa Clara, CA (US)

(73) Assignee: Google LLC, Mountain View, CA (US)

( * ) Notice: Subject to any disclaimer, the term of this patent is extended or adjusted under 35 U.S.C. 154(b) by 365 days.

(21) Appl. No.: 18/065,685

(22) Filed: Dec. 14, 2022

(65) Prior Publication Data
US 2024/0203406 A1   Jun. 20, 2024

(51) Int. Cl.
| | | |
|---|---|---|
| *G10L 15/00* | (2013.01) | |
| *G10L 15/06* | (2013.01) | |
| *G10L 15/183* | (2013.01) | |
| *G10L 15/22* | (2006.01) | |
| *G10L 15/02* | (2006.01) | |

(52) U.S. Cl.
CPC .......... *G10L 15/183* (2013.01); *G10L 15/063* (2013.01); *G10L 15/22* (2013.01); *G10L 15/02* (2013.01)

(58) Field of Classification Search
CPC ......... G10L 15/07; G10L 15/20; G10L 15/22; G10L 15/26; G10L 15/30; G10L 15/02; G10L 15/063; G10L 15/08; G10L 15/12; G10L 15/16; G10L 25/27; G10L 25/30; G10L 19/005; G10L 19/00; G10L 21/038; G10L 19/008; G10L 19/24; G10L 19/0017

See application file for complete search history.

(56) References Cited

PUBLICATIONS

Khorram Soheil et al: "Cross-Training: A Semi-Supervised Training Scheme for Speech Recognition", ICASSP 2023—2023 IEEE International Conference On Acoustics, Speech and Signal Processing (ICASSP), IEEE, Jun. 4, 2023 (Jun. 4, 2023), pp. 1-5, XP034449804.

(Continued)

*Primary Examiner* — Vu B Hang
(74) *Attorney, Agent, or Firm* — Honigman LLP; Brett A. Krueger; Grant Griffith

(57) ABSTRACT

A method includes receiving a sequence of acoustic frames extracted from unlabeled audio samples that correspond to spoken utterances not paired with any corresponding transcriptions. The method also includes generating, using a supervised audio encoder, a target higher order feature representation for a corresponding acoustic frame. The method also includes augmenting the sequence of acoustic frames and generating, as output form an unsupervised audio encoder, a predicted higher order feature representation for a corresponding augmented acoustic frame in the sequence of augmented acoustic frames. The method also includes determining an unsupervised loss term based on the target higher order feature representation and the predicted higher order feature representation and updating parameters of the speech recognition model based on the unsupervised loss term.

24 Claims, 6 Drawing Sheets

(56) References Cited

PUBLICATIONS

Khorram Soheil et al: "Contrastive Siamese Network for Semi-Supervised Speech Recognition", ICASSP 2022—2022 IEEE International Conference On Acoustics, Speech and Signal Processing (ICASSP), IEEE, May 23, 2022 (May 23, 2022), pp. 7207-7211, XP034156633.

International Search Report and Written Opinion issued in related PCT Application No. PCT/US2023/083705, dated Mar. 14, 2024.

SEMI-SUPERVISED TRAINING SCHEME FOR SPEECH RECOGNITION

TECHNICAL FIELD

This disclosure relates to a semi-supervised training scheme for speech recognition.

BACKGROUND

Automatic speech recognition (ASR) systems attempt to provide accurate transcriptions of what a person has said by taking an audio input and transcribing the audio input into text. In many instances, supervised learning is used to train ASR systems with large quantities of labeled training data that includes audio data and a corresponding transcription. Obtaining the large quantity of labeled training data required to train the ASR systems, however, is often difficult because of the amount of time required, costs, and/or privacy concerns associated with collecting the large labeled training datasets. Training ASR systems using unlabeled training data that includes only audio data can alleviate some of the difficulties with collecting large quantities of labeled training data.

SUMMARY

One aspect of the disclosure provides a cross-training network for training a speech recognition model. The cross-training network includes an unsupervised subnetwork trained on a plurality of unlabeled audio samples corresponding to spoken utterances not paired with corresponding transcriptions. The unsupervised subnetwork includes a target branch configured to receive a sequence of acoustic frames extracted from the unlabeled audio samples as input to a supervised audio encoder of the speech recognition model and generate, at each of a plurality of output steps, a target higher order feature representation for a corresponding acoustic frame in the sequence of acoustic frames input to the supervised audio encoder at a corresponding output step. The unsupervised subnetwork also includes an augmented branch configured to augment the sequence of acoustic frames extracted from the unlabeled audio samples by masking one or more acoustic frames in the sequence of acoustic frames and generate, at each of the plurality of output steps as output from an unsupervised audio encoder of the speech recognition model, a predicted higher order feature representation for a corresponding augmented acoustic frame in the sequence of augmented acoustic frames. The unsupervised subnetwork is configured to determine, at each of the plurality of output steps, an unsupervised loss term based on the target higher order feature representation generated by the target branch at the corresponding output step and the predicted higher order feature representation generated by the augmented branch at the corresponding output step and update parameters of the speech recognition model based on the unsupervised loss term determined at each of the plurality of output steps.

Implementations of the disclosure may include one or more of the following optional features. In some implementations, the unsupervised loss term includes a contrastive loss term. In some examples, the unsupervised subnetwork is further configured to determine, at each of the plurality of output steps, a distance-based loss term between parameters of the unsupervised audio encoder an parameters of the supervised audio encoder and updating the parameters of the speech recognition model is further based on the distance-based loss term determined at each of the plurality of output steps. Here, the distance-based loss term may be an L2 loss. In these examples, updating the parameters of the speech recognition model based on the unsupervised loss term occurs jointly with updating the parameters of the speech recognition model based on the distance-based loss term.

In some implementations, the cross-training training network further includes a supervised subnetwork trained on a plurality of labeled audio samples corresponding to spoken utterances paired with corresponding transcriptions. In these implementations, at each of the plurality of output steps for each labeled sample, the supervised subnetwork is configured to generate a corresponding speech recognition result for the labeled audio sample using the speech recognition model and determine a supervised loss term based on the target higher order feature representation generated by the target branch at the corresponding output step and the predicted higher order feature representation generated by the augmented branch at the corresponding output step. Here, the supervised subnetwork updates parameters of the speech recognition model based on the supervised loss term determined at each of the plurality of output steps for each labeled audio sample in the plurality of labeled audio samples. In these implementations, the corresponding speech recognition result generated for the labeled audio sample using the speech recognition model includes a probability distribution over possible speech recognition hypotheses for the labeled audio sample at the corresponding output step. The supervised subnetwork may be further configured to update the parameters of the speech recognition based on the supervised loss term jointly with the unsupervised network updating the parameters of the speech recognition model based on the unsupervised loss term and a distance-based loss term.

The target branch may be further configured to apply a stop gradient operation on the predicted higher order feature representation for the corresponding augmented acoustic frame. In some examples, the parameters of the unsupervised audio encoder and the parameters of the supervised audio encoder are initialized with the same initial parameters. In other examples, the parameters of the unsupervised audio encoder and the parameters of the supervised audio encoder are initialized with different initial parameters. Each of the unsupervised audio encoder and the supervised audio encoder includes at least one of a respective full-context encoder or a respective cascaded encoder.

Another aspect of the disclosure provides a computer-implemented method that when executed on data processing hardware causes the data processing hardware to perform operations for training a speech recognition model using a cross-training network. The operations include receiving a sequence of acoustic frame extracted from unlabeled audio samples that correspond to spoken utterances not paired with any transcriptions. At a target branch of a cross-training network, the operations include generating, at a plurality of output steps using a supervised audio encoder of a speech recognition model, a target higher order feature representation for a corresponding acoustic frame in the sequence of acoustic frames. At an augmentation branch of the cross-training network the operations include: augmenting the sequence of acoustic frames extracted from the unlabeled audio samples by masking one or more acoustic frames in the sequence of acoustic frames; and generating, at each of the plurality of output steps as output from an unsupervised audio encoder of the speech recognition model, a predicted higher order feature representation for a corresponding augmented acoustic frame in the sequence of augmented acoustic frames. The operations also include determining, at each of the plurality of output steps, an unsupervised loss term based on the target higher order feature representation generated by the target branch at the corresponding output step and the predicted higher order feature representation generated by the augmented branch at the corresponding output step. The operations also include updating parameters of the speech recognition model based on the unsupervised loss term determined at each of the plurality of output steps.

Implementations of the disclosure may include one or more of the following optional features. In some implementations, the unsupervised loss term includes a contrastive loss term. In some examples, the operations further include determining, at each of the plurality of output steps, determining a distance-based loss term between parameters of the unsupervised audio encoder and parameters of the supervised audio encoder and updating parameters of the speech recognition model is further based on the distance-based loss term determined at each of the plurality of output steps. Here, the distance-based loss term may include an L2 loss. In these examples, updating parameters of the speech recognition model based on the unsupervised loss term occurs jointly with updating the parameters of the speech recognition model based on the distance-based loss term.

In some implementations, the operations further include receiving a plurality of labeled audio samples corresponding to spoken utterances paired with corresponding transcriptions. In these implementations, at each of the plurality of output steps for each labeled audio sample, the operations also include generating, using the speech recognition model, a corresponding speech recognition result for the labeled audio sample and determining a supervised loss term based on the corresponding speech recognition result for the labeled audio sample and the corresponding transcription of the labeled audio sample. Here, the operations also include updating the parameters of the speech recognition model based on the supervised loss term determined at each of the plurality of output steps for each labeled audio sample in the plurality of labeled audio samples. The corresponding speech recognition result generated for the labeled audio sample using the speech recognition model may include a probability distribution over possible speech recognition hypotheses for the labeled audio sample at the corresponding output step. Updating parameters of the speech recognition model based on the supervised loss term may occur jointly with updating parameters of the speech recognition model based on the unsupervised loss terms and a distance-based loss term.

In some examples, the operations further include applying a stop gradient operation on the predicted higher order feature representation for the corresponding augmented acoustic frame. In some implementations, the parameters of the unsupervised audio encoder and the parameters of the supervised audio encoder are initialized with the same initial parameters. In other implementations, the parameters of the unsupervised audio encoder and the parameters of the supervised audio encoder are initialized with different initial parameters. Each of the unsupervised audio encoder and the supervised audio encoder may include at least one of a respective full-context encoder or a respective cascaded encoder.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
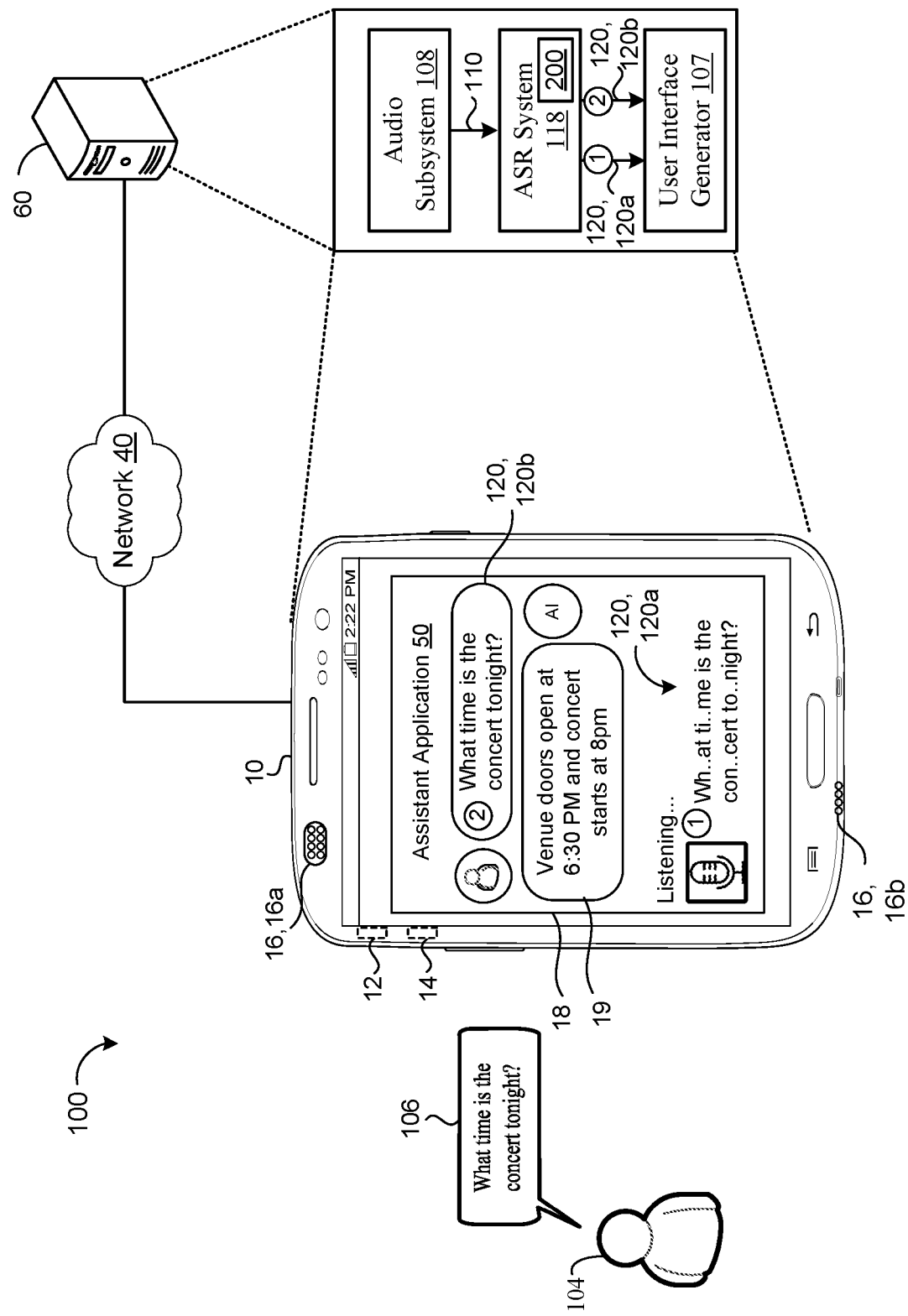
FIG. 1 is a schematic view of a speech environment executing an example speech recognition model.

Automatic speech recognition (ASR) systems are often trained using a supervised training technique that leverages labeled training data. The labeled training data includes speech audio data and corresponding transcriptions of the speech. Collecting large quantities of labeled training data is often difficult because of the associated costs, time required to collect the training data, and privacy concerns of users. In some instances, ASR systems train using unlabeled training data that includes only the speech audio data without any corresponding transcriptions of the speech. In these instances, the ASR systems may utilize only the unlabeled training data to train speech recognition systems (i.e., self-supervised training) or the unlabeled training data may be used in addition to the labeled training data to train the speech recognition systems (i.e., semi-supervised training).

However, oftentimes training speech recognition models using self-supervised training results in instability during execution. That is, despite these self-supervised training systems using computationally expensive operations of prediction networks, time modification (e.g., tempo-change), and joint training, the trained ASR systems are still instable during execution. In particular, semi-supervised training results in especially poor performance in training scenarios including when the labeled training data set is relatively small, the ASR system employs cascaded encoders to operate in a streaming fashion, and/or there is a mismatch between the labeled training data and unlabeled training data. As such, there is a need to for semi-supervised training of ASR systems that produces stable outputs during execution.

Accordingly, implementations herein are directed towards a cross-training network that uses a semi-supervised training technique for training a speech recognition model. The cross-training network includes an unsupervised subnetwork trained on a plurality of unlabeled audio samples corresponding to spoken utterances that are not paired with any corresponding transcriptions. The unsupervised subnetwork includes a target branch configured to receive, as input to a supervised audio encoder, a sequence of acoustic extracted from the unlabeled audio samples. The target branch is further configured to generate a target higher order feature representation for a corresponding acoustic frame in the sequence of acoustic frames.

The unsupervised subnetwork also includes an augmented branch configured to augment the sequence of acoustic frames extracted from the unlabeled audio samples by masking one or more acoustic frames in the sequence of acoustic frames. The augmented branch is further configured to generate, as output from an unsupervised audio encoder, a predicted higher order feature representation for a corresponding augmented acoustic frame in the sequence of augmented acoustic frames. Here, the unsupervised subnetwork determines an unsupervised loss term based on the target higher order feature representation and the predicted higher order feature representation and updates parameters of the speech recognition model based on the unsupervised loss term. As will become apparent, the unsupervised subnetwork may also determine a distance-based loss between parameters of the unsupervised audio encoder and the supervised audio encoder. Here, the unsupervised subnetwork updates parameters of the speech recognition jointly based on the unsupervised loss term and the distance-based loss term.

FIG. 1 is an example of a speech environment 100. In the speech environment 100, a user's 104 manner of interacting with a computing device, such as a user device 10, may be through voice input. The user device 10 is configured to capture sounds (e.g., streaming audio data) from one or more users 104 within the speech environment 100. Here, the streaming audio data may refer to a spoken utterance 106 by the user 104 that functions as an audible query, a command for the user device 10, or an audible communication captured by the user device 10. Speech-enabled systems of the user device 10 may field the query or the command by answering the query and/or causing the command to be performed/fulfilled by one or more downstream applications.

The user device 10 may correspond to any computing device associated with a user 104 and capable of receiving audio data. Some examples of user devices 10 include, but are not limited to, mobile devices (e.g., mobile phones, tablets, laptops, etc.), computers, wearable devices (e.g., smart watches), smart appliances, internet of things (IT) devices, vehicle infotainment systems, smart displays, smart speakers, etc. The user device 10 includes data processing hardware 12 and memory hardware 14 in communication with the data processing hardware 12 and stores instructions, that when executed by the data processing hardware 12, cause the data processing hardware 12 to perform one or more operations. The user device 10 further includes an audio system 16 with an audio capture device (e.g., microphone) 16, 16a for capturing and converting spoken utterances 106 within the speech environment 100 into electrical signals and a speech output device (e.g., a speaker) 16, 16b for communicating an audible audio signal (e.g., as output audio data from the user device 10). While the user device 10 implements a single audio capture device 16a in the example shown, the user device 10 may implement an array of audio capture devices 16a without departing from the scope of the present disclosure, whereby one or more capture devices 16a in the array may not physically reside on the user device 10, but be in communication with the audio system 16.

In the speech environment 100, an automated speech recognition (ASR) system 118 implementing a speech recognition model 200 resides on the user device 10 of the user 104 and/or on a remote computing device 60 (e.g., one or more remote servers of a distributed system executing in a cloud-computing environment) in communication with the user device 10 via a network 40. The user device 10 and/or the remote computing device (i.e., remote server) 60 also includes an audio subsystem 108 configured to receive the utterance 106 spoken by the user 104 and captured by the audio capture device 16a, and convert the utterance 106 into a corresponding digital format associated with input acoustic frames 110 capable of being processed by the ASR system 118. In the example shown, the user speaks a respective utterance 106 and the audio subsystem 108 converts the utterance 106 into corresponding audio data (e.g., acoustic frames) 110 for input to the ASR system 118. Thereafter, the speech recognition model 200 receives, as input, the audio data 110 corresponding to the utterance 106, and generates/predicts, as output, a corresponding transcription 120 (e.g., speech recognition result/hypothesis) of the utterance 106.

A digital assistant application 50 executing on the user device 10 may require the speech recognition to be streaming such that words, word pieces, and/or individual characters appear on the screen as soon as they are spoken. Additionally, it is also likely that the user 104 of the user device 10 has a low tolerance for latency when issuing queries for the digital assistant application 50 to perform. In such scenarios when minimizing speech recognition latency is preferred, the speech recognition model 200 may apply zero or minimal look ahead audio context (also referred to as "right context") to provide streaming transcription capabilities in real-time as the user 104 is speaking the utterance 106. On the other hand, when the user has a higher tolerance for speech recognition latency and/or the utterance 106 to be recognized is associated with long-form speech, the same speech recognition model 200 may apply a duration of look ahead audio context sufficient to provide an accurate transcription 120, but incur increased latency based on the duration of look ahead audio context. Accordingly, the ASR system 118 may implement only a single speech recognition model 200 for a multitude of different speech recognition tasks to provide both streaming and non-streaming transcription capabilities without having to leverage separate ASR models on a task-by-task basis.

In some implementations, the speech recognition model 200 performs both streaming speech recognition and non-streaming speech recognition on the audio data 110 in parallel. For instance, in the example shown, the speech recognition model 200 performs, in parallel, streaming speech recognition on the audio data 110 to produce partial speech recognition results 120, 120a, and non-streaming speech recognition on the same audio data 110 to produce a final speech recognition result 120, 120b. Notably, the speech recognition model 200 may use a first look ahead audio context that may be set to zero (or about 240 milliseconds) to produce the partial speech recognition results 120a and use a second look ahead audio context of a longer duration than the first look ahead audio context to produce the final speech recognition result 120b. Thus, the final speech recognition result 120b for the input utterance 106 may be delayed from the partial speech recognition results 120a for the input utterance by a duration based on a difference between the second look ahead audio context and the first look ahead audio context.

The user device 10 and/or the remote computing device 60 also executes a user interface generator 107 configured to present a representation of the transcription 120 of the utterance 106 to the user 104 of the user device 10. As described in greater detail below, the user interface generator 107 may display the partial speech recognition results 120a in a streaming fashion during time 1 and subsequently display the final speech recognition result 120b during time 2. In some configurations, the transcription 120 output from the ASR system 118 is processed, e.g., by a natural language understanding (NLU) module executing on the user device 10 or the remote computing device 60, to execute a user command/query specified by the utterance 106. Additionally or alternatively, a text-to-speech system (not shown) (e.g., executing on any combination of the user device 10 or the remote computing device 60) may convert the transcription into synthesized speech for audible output by the user device 10 and/or another device.

In the example shown, the user 104 interacts with a program or application 50 (e.g., the digital assistant application 50) of the user device 10 that uses the ASR system 118. For instance, FIG. 1 depicts the user 104 communicating with the digital assistant application 50 and the digital assistant application 50 displaying a digital assistant interface 18 on a screen of the user device 10 to depict a conversation between the user 104 and the digital assistant application 50. In this example, the user 104 asks the digital assistant application 50, "What time is the concert tonight?" This question from the user 104 is a spoken utterance 106 captured by the audio capture device 16a and processed by audio systems 16 of the user device 10. In this example, the audio system 16 receives the spoken utterance 106 and converts it into acoustic frames 110 for input to the ASR system 118.

Continuing with the example, the speech recognition model 200, while receiving the acoustic frames (i.e., audio data) 110 corresponding to the utterance 106 as the user 104 speaks, encodes the acoustic frames 110 using a first look ahead audio context and then decodes the encoded acoustic frames 110 using the first look ahead audio context into the partial speech recognition results 120a. During time 1, the user interface generator 107 presents, via the digital assistant interface 18, a representation of the partial speech recognition results 120a of the utterance 106 to the user 104 of the user device 10 in a streaming fashion such that words, word pieces, and/or individual characters appear on the screen as soon as they are spoken. In some examples, the first look ahead audio context is equal to zero.

In parallel, and after all of the acoustic frames 110 corresponding to the utterance 106 are received, the speech recognition model 200 encodes all of the acoustic frames 110 corresponding to the utterance 106 using a second look ahead audio context and then decodes the acoustic frames 110 using the second look ahead audio context into a final speech recognition result 120b. The duration of the second look ahead audio context may be 1.2 seconds, 2.4 seconds, or any other duration. In some examples, an indication such as an endpoint indicating that the user 104 has finished speaking the utterance 106 triggers the speech recognition model 200 to encode all the acoustic frames 110 using the second look ahead audio context. During time 2, the user interface generator 107 presents, via the digital assistant interface 18, a representation of the final speech recognition result 120b of the utterance 106 to the user 104 of the user device 10. In some implementations, the user interface generator 107 replaces the representation of the partial speech recognition results 120a with the representation of the final speech recognition result 120b. For instance, as the final speech recognition result 120b is presumed to be more accurate than the partial speech recognition results 120a produced without leveraging look ahead audio context, the final speech recognition result 120b ultimately displayed as the transcription 120 may fix any terms that may have been misrecognized in the partial speech recognition results 120a. In this example, the streaming partial speech recognition results 120a output by the speech recognition model 200 and displayed on the screen of the user device 10 at time 1 are associated with low latency and provide responsiveness to the user 104 that his/her query is being processed, while the final speech recognition result 120b output by the speech recognition model 200 and displayed on the screen at time 2 leverages look ahead audio context to improve the speech recognition quality in terms of accuracy, but at increased latency. However, since the partial speech recognition results 120a are displayed as the user speaks the utterance 106, the higher latency associated with producing, and ultimately displaying the final recognition result is not noticeable to the user 104.

In the example shown in FIG. 1, the digital assistant application 50 may respond to the question posed by the user 104 using natural language processing. Natural language processing generally refers to a process of interpreting written language (e.g., the partial speech recognition results 120a and/or the final speech recognition result 120b) and determining whether the written language prompts any action. In this example, the digital assistant application 50 uses natural language processing to recognize that the question from the user 104 regards the user's schedule and more particularly a concert on the user's schedule. By recognizing these details with natural language processing, the automated assistant returns a response 19 to the user's query where the response 19 states, "Venue doors open at 6:30 PM and concert starts at 8 pm." In some configurations, natural language processing occurs on a remote server 60 in communication with the data processing hardware 12 of the user device 10.

Figure 2:
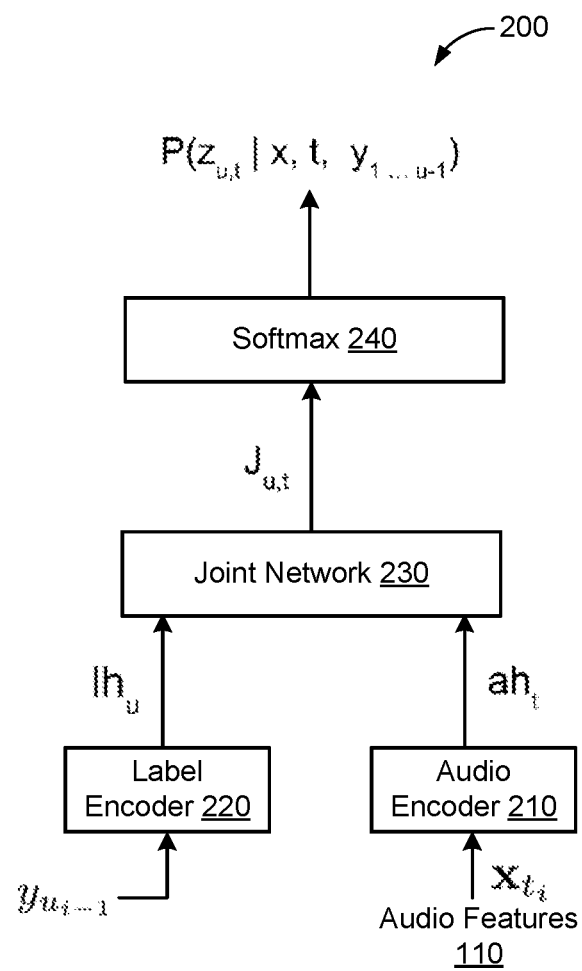
FIG. 2 is a schematic view of the example speech recognition model of FIG. 1.

With reference to FIG. 2, the speech recognition model 200 may provide an end-to-end (E2E) speech recognition by integrating acoustic, pronunciation, and language models into a single neural network, and does not require a lexicon or a separate text normalization component. Various structures and optimization mechanisms can provide increased accuracy and reduced model training time. In some implementations, the speech recognition model 200 includes a Transformer-Transducer (T-T) model architecture, which adheres to latency constraints associated with interactive applications. The T-T model 200 may include the T-T model 200 described in U.S. patent application Ser. No. 17/210,465, filed on Mar. 23, 2021, the contents of which are incorporated herein by reference in their entirety. The T-T model 200 provides a small computational footprint and utilizes less memory requirements than conventional ASR architectures, making the T-T model architecture suitable for performing speech recognition entirely on the user device 10 (e.g., no communication with a remote server 60 is required). The T-T model 200 includes an audio encoder 210, a label encoder 220, and a joint network 230. The audio encoder 210, which is roughly analogous to an acoustic model (AM) in a traditional ASR system, may include a neural network having a stack of strided convolutional layers and transformer layers. Moreover, the audio encoder 210 may include a supervised audio encoder 212 (FIG. 3) and an unsupervised audio encoder 216 (FIG. 3). The audio encoder 210 reads a sequence of d-dimensional feature vectors (e.g., acoustic frames 110 (FIG. 1)) $x=(x_1, x_2, \ldots, x_T)$, where $x_t \in \mathbb{R}^d$, and produces at each time step a higher-order feature representation (also referred to as an "encoder output"). This higher-order feature representation is denoted as $ah_1, \ldots, ah_T$. Each transformer layer of the audio encoder 210 may include a normalization layer, a masked multi-head attention layer with relative position encoding, residual connections, a stacking/unstacking layer, and a feedforward layer. Similarly, the label encoder 220 may also include a neural network of transformer layers or a look-up table embedding model, which, like a language model (LM), processes the sequence of non-blank symbols output by a final Softmax layer 240 so far, $y_0, \ldots, y_{ui-1}$, into a dense representation $Ih_u$ that encodes predicted label history. In implementations when the label encoder 220 includes the neural network of transformer layers, each transformer layer may include a normalization layer, a masked multi-head attention layer with relative position encoding, a residual connection, a feed forward layer, and a dropout layer. In these implementations, the label encoder 220 may include two transformer layers. In implementations when the label encoder 220 includes the look-up table embedding model with a bi-gram label context, the embedding model is configured to learn a weight vector of the d-dimension for each possible bigram label context, where d is the dimension of the outputs of the audio and label encoders 210, 220. In some examples, the total number of parameters in the embedding model is $N^2 \times d$ where N is the vocabulary size for the labels. Here, the learned weight vector is then used as the embedding of the bigram label context in the T-T model 200 to produce fast label encoder 220 runtimes.

Finally, with the T-T model architecture, the representations produced by the audio and label encoders 210, 220 are combined by the joint network 230 using a dense layer Jut. The joint network 230 then predicts $P(z_{u,t}|x, t, y_1, \ldots, y_{u-1})$, which is a distribution over the next output symbol. Stated differently, the joint network 230 generates, at each output step (e.g., time step), a probability distribution over possible speech recognition hypotheses. Here, the "possible speech recognition hypotheses" correspond to a set of output labels (also referred to as "speech units") each representing a grapheme (e.g., symbol/character) or a word piece in a specified natural language. For example, when the natural language is English, the set of output labels may include twenty-seven (27) symbols, e.g., one label for each of the 26-letters in the English alphabet and one label designating a space. Accordingly, the joint network 230 may output a set of values indicative of the likelihood of occurrence of each of a predetermined set of output labels. This set of values can be a vector (e.g., a one-hot vector) and can indicate a probability distribution over the set of output labels. In some cases, the output labels are graphemes (e.g., individual characters, and potentially punctuation and other symbols), but the set of output labels is not so limited. For example, the set of output labels can include wordpieces and/or entire words, in addition to or instead of graphemes. The output distribution of the joint network 230 can include a posterior probability value for each of the different output labels. Thus, if there are 100 different output labels representing different graphemes or other symbols, the output $z_{u,t}$ of the joint network 230 can include 100 different probability values, one for each output label. The probability distribution can then be used to select and assign scores to candidate orthographic elements (e.g., graphemes, wordpieces, and/or words) in a beam search process (e.g., by the Softmax layer 240) for determining the transcription 120.

The Softmax layer 240 may employ any technique to select the output label/symbol with the highest probability in the distribution as the next output symbol predicted by the T-T model 200 at the corresponding output step. In this manner, the T-T model 200 does not make a conditional independence assumption, rather the prediction of each symbol is conditioned not only on the acoustics but also on the sequence of labels output so far. While the speech recognition model 200 is described as having the T-T model architecture, the speech recognition model 200 may include other types of transducer-based architectures, such as a Conformer-Transducer (C-T) model architecture or a Recurrent Neural Network-Transducer (RNN-T) model architecture.

Figure 3A:
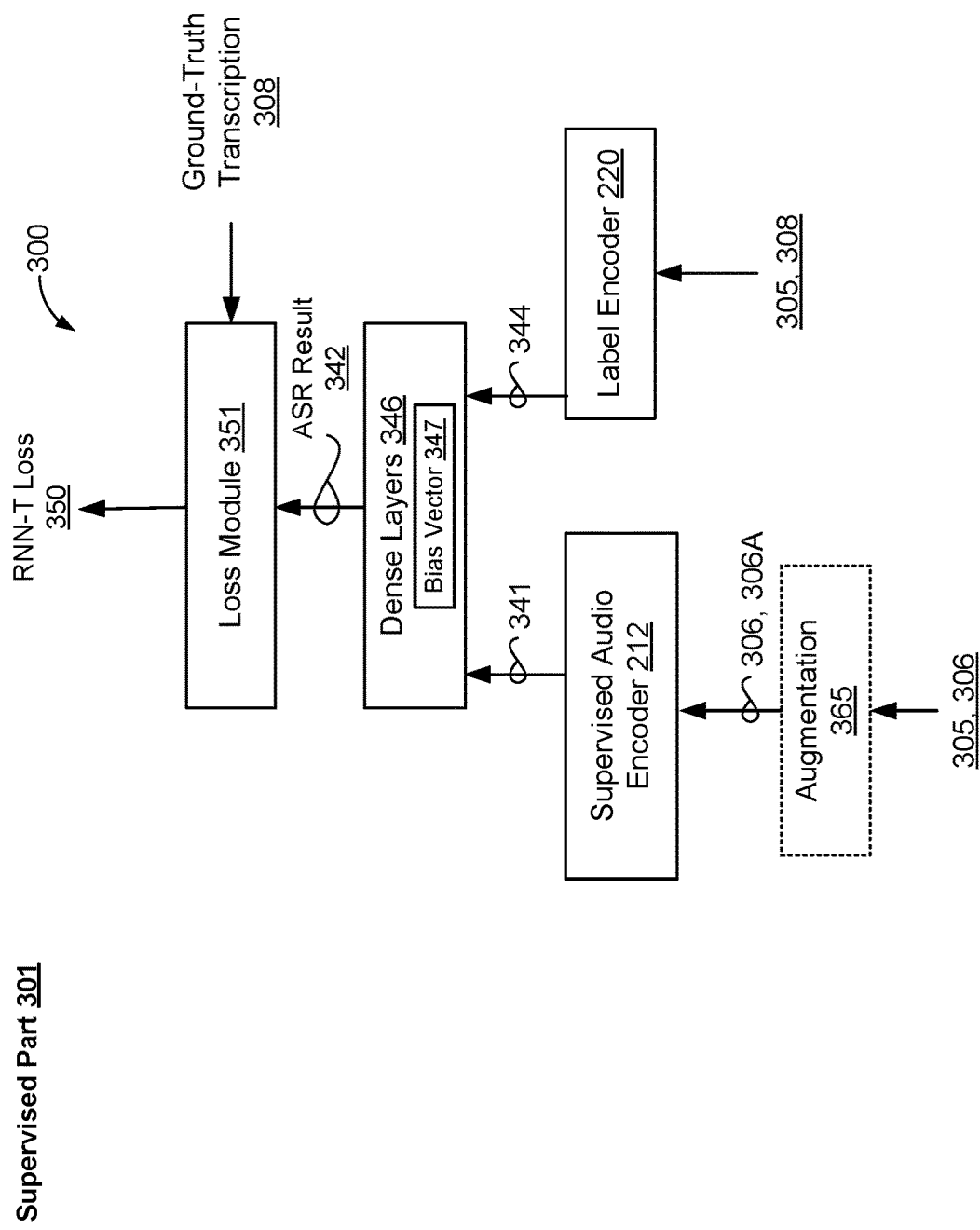
FIG. 3A is a schematic view of a supervised part of a cross-training networking executing a semi-supervised training process for a speech recognition model.
Figure 3B:
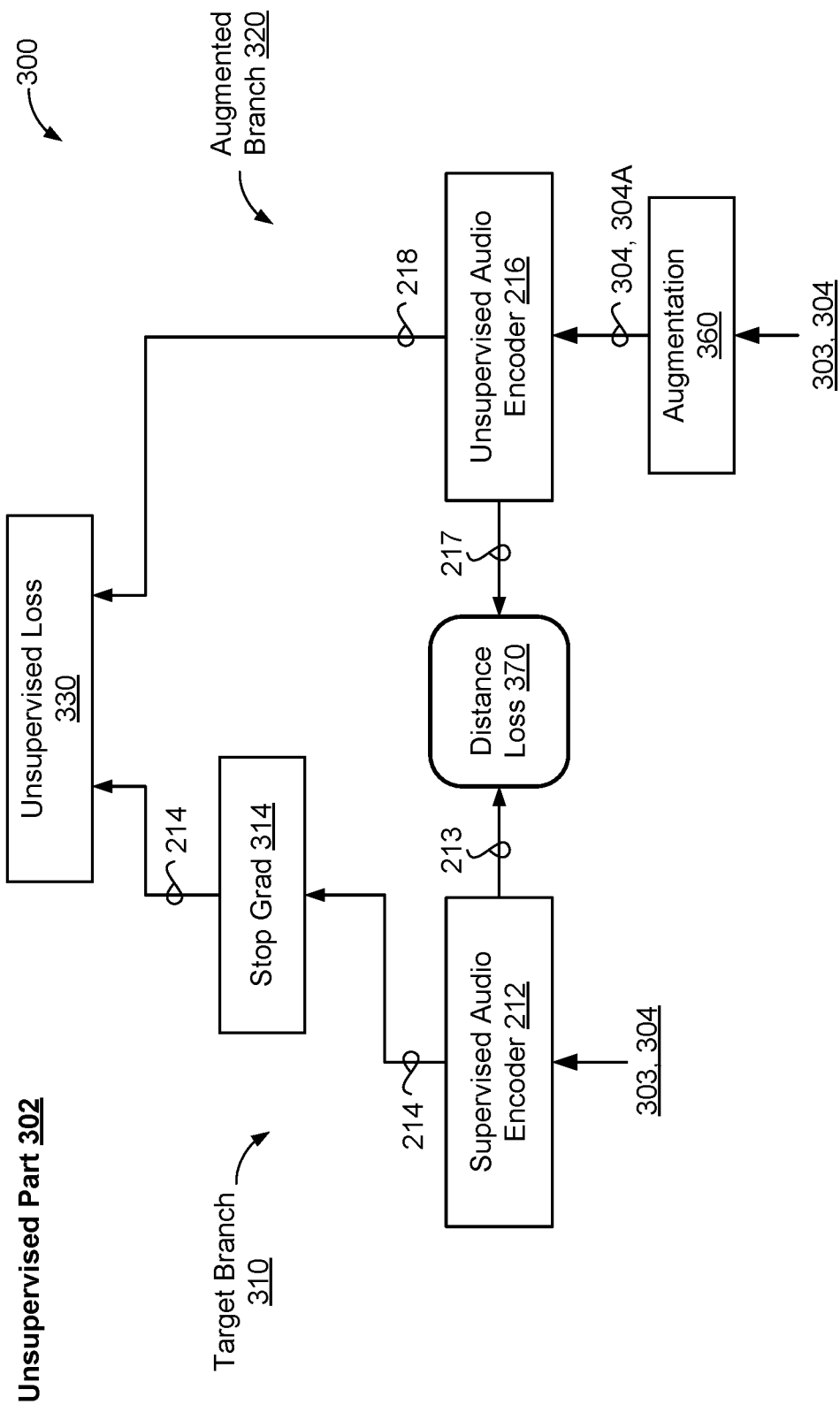
FIG. 3B is a schematic view of an unsupervised part of the cross-training network executing the semi-supervised training process for the speech recognition model.

FIGS. 3A and 3B illustrate schematic views of a cross-training network 300 executing a semi-supervised training process for training the speech recognition model 200 (FIG. 2). The cross-training network includes a supervised subnetwork training process 301 (FIG. 3A) and an unsupervised subnetwork training process 302 (FIG. 3B). The supervised subnetwork training process (i.e., supervised subnetwork) 301 trains the speech recognition model 200 using a plurality of labeled audio samples 305 that includes a sequence of acoustic frames 304 extracted from spoken utterances 106 paired with corresponding transcriptions (i.e., labels) 308. The unsupervised subnetwork training process (i.e., unsupervised subnetwork) 302 trains the speech recognition model 200 using a plurality of unlabeled audio samples 303 that includes a sequence of acoustic frames 304 extracted from spoken utterances 106 without any paired transcriptions.

In some examples, the acoustic frames 306 used by the supervised subnetwork (i.e., supervised part) 301 are the same as the acoustic frames 304 used by the unsupervised subnetwork (i.e., unsupervised part) 302. That is, the supervised part 301 and the unsupervised part 302 may train the speech recognition model 200 using the same acoustic frames 304, 306 concurrently. In other examples, the acoustic frames 306 used to train the supervised part 301 are different from the acoustic frames 304 used to train the unsupervised part 302. This scenario is especially beneficial since the unlabeled audio samples 303 without any corresponding transcriptions are easy to obtain and can be leveraged to train the speech recognition model 200. As such, the speech recognition model 200 may be trained on any combination of labeled audio samples 305 and/or unlabeled audio samples 303. In some examples, the sequence of acoustic frames 304, 306 extracted from the unlabeled audio samples 303 and labeled audio samples 305 include log Mel-filterbank energies. A greater number acoustic frames 304 may be used to train the unsupervised part 302 than the number of acoustic frames 306 used to train the supervised part 301. Optionally, a greater number of acoustic frames 306 may be used to train the supervised part 301 than the number acoustic frames 304 used to train the unsupervised part 302. In some examples, the number of acoustic frames 306 used to train the supervised part 301 and the number of acoustic frames 304 used to train the unsupervised part 302 are the same.

The supervised part 301 includes a supervised audio encoder 212 of the speech recognition model 200 that is shared with a target branch 310 of the unsupervised part 302. The unsupervised part 302 further includes an unsupervised audio encoder 216 at an augmented branch 320 that is different than the supervised audio encoder 212. Here, the supervised and unsupervised audio encoders 212, 216 may each include a stack of strided convolutional layers (e.g., two convolutional layers) and transformer layers (e.g., twenty bidirectional transformer layers). In some implementations, the supervised and unsupervised audio encoders 212, 216 each include a respective full-context encoder operating in a non-streaming fashion. Here the full-context encoder outputs, at each of a plurality of output steps, encoder outputs corresponding to final speech recognition results 120b (FIG. 1). In other implementations, supervised and unsupervised audio encoders 212, 216 each include a respective cascaded encoder operating in a streaming fashion. That is, the cascaded encoder includes a causal encoder that does not receive any right-context and outputs, at each of the plurality of output steps, encoder outputs corresponding to partial speech recognition results 120a (FIG. 1). Moreover, the cascaded encoder includes a non-causal encoder that receives additional right-context and outputs, at each of the plurality of output steps, encoder outputs corresponding to the final speech recognition results 120b (FIG. 1).

Referring now to FIG. 3A, the supervised part 301 of the cross-training network 300 trains the speech recognition model 200 using the plurality of labeled audio samples 305. Each labeled audio sample 305 of the plurality of labeled audio samples 305 corresponds to a spoken utterance 106 paired with a corresponding transcription 308. The plurality of labeled audio samples 305 include the sequence of acoustic frames 306 extracted from the labeled audio samples 305. The supervised part 301 shares the same supervised audio encoder 212 from the speech recognition model 200 as the target branch 310 of the unsupervised part 302. The supervised part 301 also includes the label encoder 220 and dense layers 346 with a bias vector 347 (e.g., the joint network 230).

Optionally, the supervised part 301 may include a data augmentation module 365 (denoted by dashed lines) that applies data augmentation to at least one acoustic frame 306 extracted from the labeled audio samples 305 to generate a sequence of augmented acoustic frames 306, 306A. The data augmentation module 365 of the supervised part 301 may be the same (or different) as a data augmentation module 360 (FIG. 3B) of the unsupervised part 302. In some examples, the data augmentation module 365 of the supervised part 301 applies different data augmentation techniques than the data augmentation module 360 of the unsupervised part. Applying data augmentation to the acoustic frames 306 furthers the acoustic diversity of the audio frames used to train the speech recognition model 200. The data augmentation module 360 may include a time masking component that masks portions of the acoustic frames 306. Other techniques applied by the data augmentation module 360 may include adding/injecting noise and/or adding reverberation of the labeled audio samples 305. One data augmentation technique includes using multistyle training (MTR) to inject a variety of environmental noises to the labeled audio samples 305. Another data augmentation technique that the data augmentation module 360 may apply in addition to, or in lieu of, MTR, includes using spectrum augmentation (SpecAugment) to make the acoustics of the labeled audio samples 305 closer to the adverse acoustics of other labeled audio samples 305. In combination, MTR and SpecAugment may inject noises into the labeled audio samples 305, tile random external noise sources along time and inserted before and overlapped onto the representation, and filtering the noise-injective labeled audio samples prior to training the speech recognition model 200.

In some examples, when the supervised part 301 includes the data augmentation module 365, the supervised audio encoder 212 receives the augmented sequence of acoustic frames 306A and generates, at each output step, a higher order feature representation 341 for a corresponding augmented acoustic frame 306A in the sequence of augmented acoustic frames 306A. In other examples, when the supervised part 301 does not include the data augmentation module 365, the supervised audio encoder 212 receives the sequence of acoustic frames 306 directly and generates, at each output step, the higher order feature representation 341 for a corresponding acoustic frame 306 in the sequence of acoustic frames 306. More specifically, the strided convolutional layers of the supervised audio encoder 212 receive the augmented acoustic frame 306A (or acoustic frame 306) and generate a corresponding output. Here, the transformer layers of the supervised audio encoder 212 receive the corresponding output and generate the higher order feature representation 341.

The label encoder 220 is a streaming transformer that does not attend to future labels 308. Accordingly, the label encoder 220 receives a label 308 corresponding to the augmented acoustic frame 306A (or acoustic frame 306) received by the supervised audio encoder 212 and generates, at each output step, a linguistic embedding 344 (i.e., dense representation $lh_u$ (FIG. 2)). The supervised part 301 includes dense layers 346 that process the linguistic embedding 344 from the label encoder 220 and the higher order feature representation 341 (i.e., acoustic embedding) from the supervised audio encoder 210 to generate, at each output step, a corresponding speech recognition result 342 for a corresponding augmented acoustic frame 306A (or acoustic frame 306) using the speech recognition model 200. The dense layers 346 include a trainable bias vector 347 that performs a linear operation on the higher order feature representation 341 and the linguistic embedding 344 to generate the speech recognition result 342. The speech recognition results 342 may include a probability distribution over possible speech recognition hypotheses for the labeled audio sample 305 at the corresponding output step. A loss module 351 of the supervised part 301 determines, at each of the plurality of output steps, a supervised loss term 350 based corresponding speech recognition result 342 for the labeled audio sample 305 and the corresponding transcription 308 of the labeled audio sample 305. That is, the loss module 351 compares the speech recognition result 342 to the label (e.g., ground truth transcription) 308 to generate the supervised loss term 350. The supervised loss term (e.g., RNN-T loss) 350 may be represented by:

$$r_t = \text{linear}(\tanh(\text{linear}(a_t) + \text{linear}(l_t))) \quad (1)$$

In Equation 1, $r_t$ represents a logit vector that specifies the probability of graphemes including the blank symbol, $a_t$ represents the higher order feature representation 341 from the supervised audio encoder 212, $l_t$ represents linguistic embeddings 344 from the label encoder 220, and linear represents the conventional dense layers 346 with the trainable bias vector 347.

The supervised part 301 updates parameters of the speech recognition model 200 based on the supervised loss term 350 determined at each of the plurality of output steps for each labeled audio sample 305 in the plurality of labeled audio samples 305. In some implementations, the supervised part 301 is configured to update the parameters of the speech recognition model 200 based on the supervised loss term 350 independently of the unsupervised part 302 updating the parameters of the speech recognition model 200. In other implementations, the supervised part 301 is configured to update the parameters of the speech recognition model 200 based on the supervised loss term 350 jointly with the unsupervised part 302 updating the parameters of the speech recognition model 200. Updating parameters of the speech recognition model 200 may include updating parameters of the supervised audio encoder 212.

Referring now to FIG. 3B, the unsupervised part 302 trains the speech recognition model 200 using a plurality of unlabeled audio samples 303 that includes a sequence of acoustic frames extracted from spoken utterances 106 that are not paired with any transcriptions. The unsupervised part 302 of the cross-training network 300 includes a target branch 310 and an augmented branch 320. Here, the target branch 310 shares the same supervised audio encoder 212 of the speech recognition model 200 as the supervised part 301 (FIG. 3A). The augmented branch 320 includes the unsupervised audio encoder 216 of the speech recognition model 200. The unsupervised part 302 is configured to extract linguistic information by matching higher order feature representations (e.g., target higher order feature representations 214 and predicted higher order feature representations 218) of the target branch 310 and the augmented branch 320.

The target branch 310 is configured to generate a target higher order feature representation 214 based on the sequence of acoustic frames 304 extracted from the unlabeled audio samples 303. The supervised audio encoder 212 of the target branch receives the sequence of acoustic frames 304 and generates, at each output step of the plurality of output steps, a target higher order feature representation 214 for a corresponding acoustic frame 304. In particular, the strided convolutional layers of the supervised audio encoder 212 receive an acoustic frame 304 from the sequence of acoustic frames and generate an output that the transformer layer use to generate the target higher order feature representation 214 for the corresponding acoustic frame.

The target branch 310 does not back-propagate gradients to train the supervised audio encoder 210 through the target branch 310. In particular, training both the supervised audio encoder 212 and the unsupervised audio encoder 216 with contrastive losses may cause the encoders to learn irrelevant relations by learning to minimize the contrastive loss by transferring positional information to the outputs of the encoders (i.e., shortcut learning problem). As such, the target branch 310 applies a stop gradient operation 314 on the target higher order feature representation 214 to prevent back-propagation of the gradients (e.g., contrastive loss) to the supervised audio encoder 212 through the target branch 310. Thus, applying the stop gradient operation 314 overcomes the shortcut learning problem.

The augmentation branch 320 of the unsupervised part 302 includes a data augmentation module 360 that applies data augmentation the sequence of acoustic of acoustic frames 304 extracted from the unlabeled audio samples 303. That is, the data augmentation module 360 receives the sequence of acoustic frames and generates a sequence of augmented acoustic frames 304A. Here, the data augmentation module 360 augments the sequence of acoustic frames 304 by masking one or more acoustic frames 304 in the sequence of acoustic frames. As will become apparent, the data augmentation module 360 does not apply time modification on the sequence of acoustic frames 304 to avoid outputs of the unsupervised part 302 "collapsing" to a constant value. Other techniques applied by the data augmentation module 360 may include adding/injecting noise and/or adding reverberation of the labeled audio samples. One data augmentation technique includes using multistyle training (MTR) to inject a variety of environmental noises to the unlabeled audio samples 303. Another data augmentation technique that the data augmentation module 360 may apply in addition to, or in lieu of, MTR, includes using spectrum augmentation (SpecAugment) to make the acoustics of the augmented acoustic frames 304 closer to the adverse acoustics of other unlabeled audio samples 303. In combination, MTR and SpecAugment may inject noises into the unlabeled audio samples 303, tile random external noise sources along time and inserted before and overlapped onto the representation, and filtering the noise-injective unlabeled audio samples prior 303 to training the speech recognition model 200.

The unsupervised audio encoder 216 of the augmented branch 320 receives the augmented sequence of acoustic frames 304A from the data augmentation module 360 and generates, at each of the plurality of output steps, a predicted higher order feature representation 218 for the corresponding augmented acoustic frame 304A. In particular, the strided convolutional layers of the unsupervised audio encoder 216 receive an the augmented acoustic frame 304A from the sequence of augmented acoustic frames 304A and generate an output that the transformer layer use to generate the predicted higher order feature representation 218 for the corresponding augmented acoustic frame 304A. Thus, the unsupervised audio encoder 216 generates the predicted higher order feature representations 218 to match the corresponding target higher order feature representations 214 generated by the supervised audio encoder 212 at a corresponding output step.

The unsupervised part 302 determines an unsupervised loss term 330 based on the target higher order feature representation 214 generated by the target branch 310 at the corresponding output step and the predicted higher order feature representation 218 generated by the augmented branch 320 at the corresponding output step. In some examples, the unsupervised loss term 330 includes a contrastive loss term represented by:

$$L_{cont} = \sum_{t \in M} -\log \frac{\exp\ sim(h_t, c_t)/\tau}{\sum_{k \in K} \exp\ sim(h_t, c_t)/\tau} \quad (2)$$

In Equation 2, M includes a set of masked frame indices, K includes a set of distractor indices, $h_t$ is an encoder output, and $c_t$ a convolutional neural network output. In other examples, the unsupervised loss term 330 includes a reconstruction loss term L1 or cosine distance loss term. The unsupervised part 302 may update parameters of the speech recognition model 200 based on the unsupervised loss term 330 jointly with the supervised part 301 updating parameters of the speech recognition model 200 based on the supervised loss term 350 represented by:

$$\hat{p} = \mathrm{argmin}_p L_s(p) + L_u(p) \quad (3)$$

In Equation 3, p represents parameters of the speech recognition model 200, $L_s(p)$ represents the supervised loss term 350, and $L_u(p)$ represents the unsupervised loss term 330. Notably, using the acoustic frames 304 the target branch 310 generates an expected representation (i.e., target higher order feature representation 214) based on the current state of the supervised audio encoder 212 and the augmented branch 320 aims to match the expected representation using the augmented acoustic frames 304A.

In some examples, the unsupervised part 302 determines, at each of the plurality of output steps, a distance-based loss term 370 between parameters 213 of the supervised audio encoder 212 and parameters 217 of the unsupervised audio encoder 216. The distance-based loss term 370 may include an L2 loss. In scenarios where the supervised loss term 350 and the unsupervised loss term 330 are inconsistent and have uncorrelated or negatively correlated gradients, the parameters 213 of the supervised audio encoder 212 and the parameters 217 of the unsupervised audio encoder 216 are considered to stabilize training of the speech recognition model 200. As such, the cross-training network 300 aims to make the parameters 213, 217 the same during training according to:

$$\hat{p}_s, \hat{p}_u = \mathrm{argmin}_{p_s, p_u} L_s(p_s) + L_u(p_u) \qquad (4)$$

In Equation 4, $p_s$ represents the parameters 213 of the supervised audio encoder 212 and $p_u$ represents the parameters 217 of the unsupervised audio encoder 216. Using a Lagrange multiplier method, Equation 4 can be rewritten as:

$$\hat{p}_s, \hat{p}_u = \mathrm{argmin}_{p_s, p_u} L_s(p_s) + L_u(p_u) + \lambda \|p_s - p_u\|^2 \qquad (5)$$

Equation 5 represents a total loss used to train the speech recognition model 200 including the supervised loss term 350, the unsupervised loss term 330, and the distance-based loss term 370. Here, the cross-training network 300 may jointly update the parameters of the speech recognition model 200 based on the supervised loss term 350, the unsupervised loss term 330, and the distance-based loss term 370. Notably, by minimizing these three losses jointly, the cross-training network 300 does not force parameters of the supervised part 301 and the unsupervised part 302 to be identical at all training steps (e.g., output steps). Instead, the parameters of the supervised part 301 and the unsupervised part 302 (e.g., the parameters 213 of the supervised audio encoder 212 and the parameters 217 of the unsupervised audio encoder 216) have the flexibility to be different during training, but the distance-based loss term 370 gradually reduces the distance between them at each output step. Thus, in Equation 5 $\lambda$ represents a knowledge transfer parameter whereby $\lambda=0$ results in independent training of the supervised part 301 and the unsupervised part 302 such that training is completely stable but will not leverage unlabeled data for the supervised part. On the other hand, large values of $\lambda$ force the supervised part 301 and the unsupervised part 302 to be identical thereby making training unstable. The transfer parameter may be set to any value. Updating parameters of the speech recognition model 200 may include jointly updating the parameters 213 of the supervised audio encoder 212 and the parameters 217 of the unsupervised audio encoder 216.

Other implementations of semi-supervised training rely on time modification and prediction networks to avoid outputs of speech recognition models "collapsing" to a constant value during training. Advantageously, training the speech recognition model 200 jointly with the supervised loss term 350, unsupervised loss term 330, and the distance-based loss term 370 allows the cross-training network 300 to leverage both unlabeled audio samples 303 and labeled audio samples 305 without outputs "collapsing" to a constant value. Notably, using the distance-based loss term 370 term alleviates avoids the collapse to the constant value without using the computationally expensive operations of time modification and prediction networks used by other semi-supervised training implementations. In particular, the cross-training network 300 improves stability of the speech recognition model 200 even when labeled audio samples 305 are relatively small, the speech recognition model 200 employs cascaded encoders in a streaming fashion, and when there is a mismatch between the unlabeled audio samples 303 and the labeled audio samples 305. Moreover, the cross-training network 300 may initialize the parameters 213 of the supervised audio encoder and the parameters 217 of the unsupervised audio encoder 216 with the same initial parameters or with different initial parameters without negatively impacting the resulting speech recognition performance. After the cross-training network 300 trains the speech recognition model 200, the speech recognition model 200 may execute with the supervised audio encoder 212.

Figure 4:
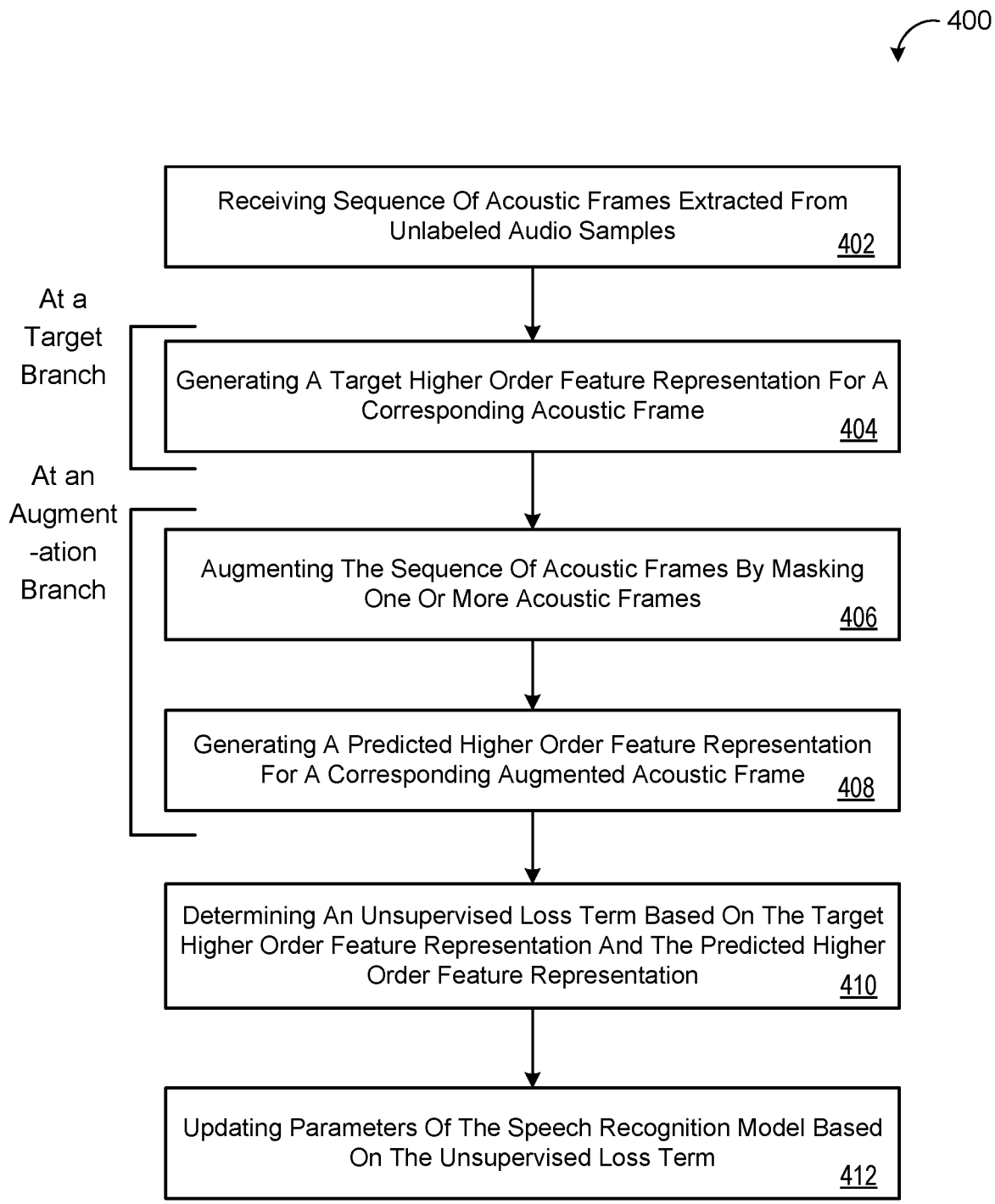
FIG. 4 is a flowchart of an example arrangement of operations for a method of training a speech recognition model using a cross-training model.

FIG. 4 is a flowchart of an exemplary arrangement of operations for a computer-implemented method 400 of training a speech recognition model using a cross-training network 300. At operation 402, the method 400 includes receiving a sequence of acoustic frames 304 extracted from unlabeled audio samples 303 corresponding to spoken utterances 106 not paired with any corresponding transcriptions. A target branch 310 of the cross-training network 300 includes a supervised audio encoder 212 of a speech recognition model 200. At operation 404, the method 400 includes generating, using the supervised audio encoder 212 at a plurality of output steps, a target higher order feature representation 214 for a corresponding acoustic frame 340 in the sequence of acoustic frames 304. At an augmentation branch 320 of the cross-training network 300, the method 400 performs operations 406 and 408. At operation 406, the method 400 includes augmenting the sequence of acoustic frames 304 extracted from the unlabeled audio samples 303 by masking one or more acoustic frames 204 in the sequence of acoustic frames 304. At operation 408, the method 400 includes generating, at each of the plurality of output steps as output from an unsupervised audio encoder 216 of the speech recognition model 200, a predicted higher order feature representation 218 for a corresponding augmented acoustic frame 304A in the sequence of augmented acoustic frames 304A.

At operation 410, the method 400 includes determining, at each of the plurality of output steps, an unsupervised loss term 330 based on the target higher order feature representation 214 generated by the target branch 310 at the corresponding output step and the predicted higher order feature representation 218 generated by the augmented branch 320 at the corresponding output step. At operation 412, the method 400 includes updating parameters of the speech recognition model 200 based on the unsupervised loss term 330 determined at each of the plurality of output steps. Here, updating parameters of the speech recognition model 200 may include updating parameters of the supervised audio encoder 212 jointly with updating parameters of the unsupervised audio encoder 216.

Figure 5:
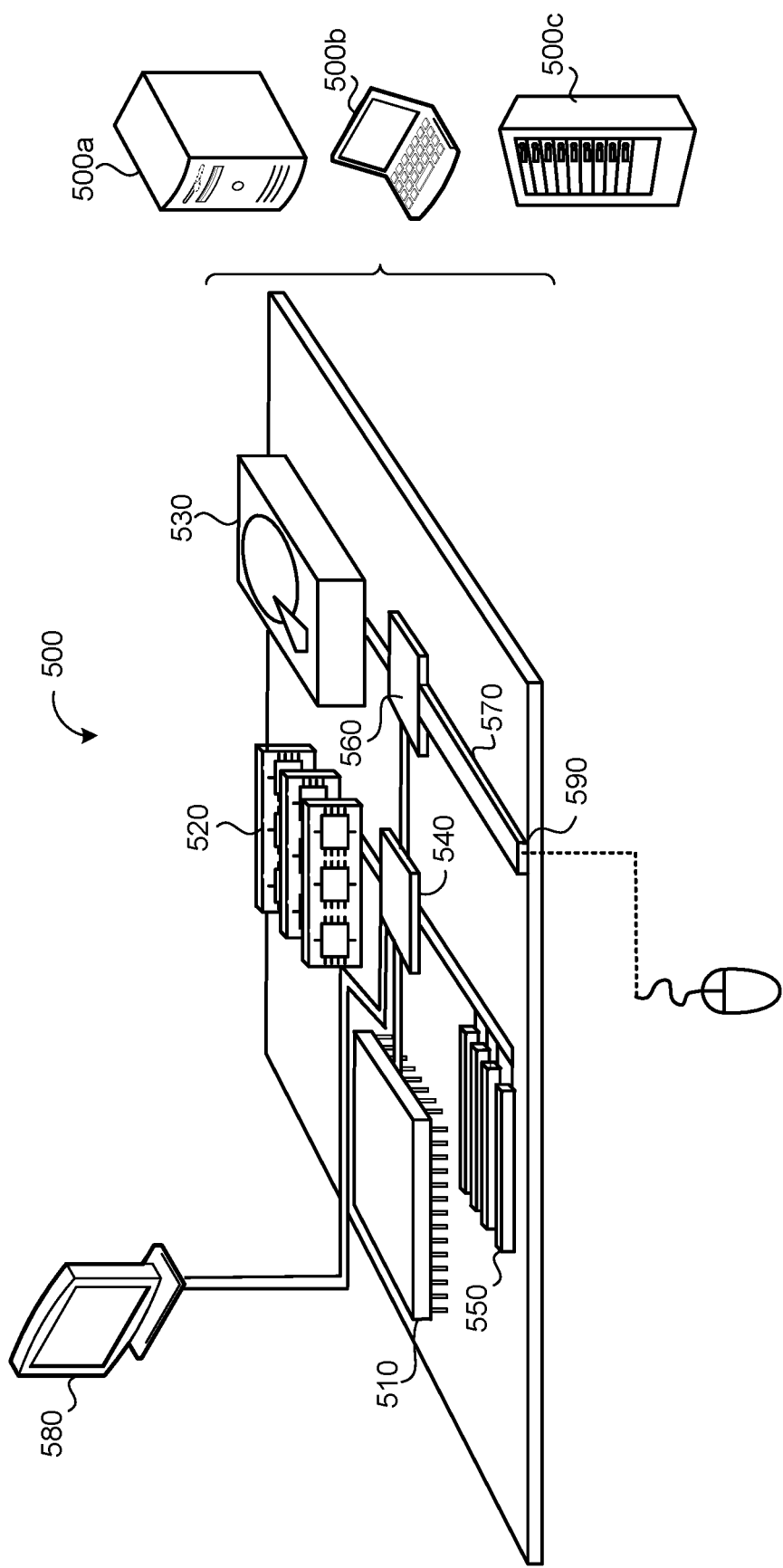
FIG. 5 is a schematic view of an example computing device that may be used to implement the systems and methods described herein.

FIG. 5 is schematic view of an example computing device 500 that may be used to implement the systems and methods described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 500 includes a processor 510, memory 520, a storage device 530, a high-speed interface/controller 540 connecting to the memory 520 and high-speed expansion ports 550, and a low speed interface/controller 560 connecting to a low speed bus 570 and a storage device 530. Each of the components 510, 520, 530,

540, 550, and 560, are interconnected using various busses, and may be mounted on a common motherboard or in other manners as appropriate. The processor 510 can process instructions for execution within the computing device 500, including instructions stored in the memory 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500a or multiple times in a group of such servers 500a, as a laptop computer 500b, or as part of a rack server system 500c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A cross-training network for training a speech recognition model, the cross-training network comprising an unsupervised subnetwork trained on a plurality of unlabeled audio samples corresponding to spoken utterances not paired with corresponding transcriptions, the unsupervised subnetwork comprising:
   a target branch configured to:
      receive, as input to a supervised audio encoder of the speech recognition model, a sequence of acoustic frames extracted from the unlabeled audio samples; and
      at each of a plurality of output steps, generate a target higher order feature representation for a corresponding acoustic frame in the sequence of acoustic frames input to the supervised audio encoder at a corresponding output step; and
   an augmented branch configured to:
      augment the sequence of acoustic frames extracted from the unlabeled audio samples by masking one or more acoustic frames in the sequence of acoustic frames; and
      at each of the plurality of output steps, generate, as output from an unsupervised audio encoder of the speech recognition model, a predicted higher order feature representation for a corresponding augmented acoustic frame in the sequence of augmented acoustic frames,
   wherein the unsupervised subnetwork is configured to:
      at each of the plurality of output steps, determine an unsupervised loss term based on the target higher order feature representation generated by the target branch at the corresponding output step and the predicted higher order feature representation generated by the augmented branch at the corresponding output step; and
      update parameters of the speech recognition model based on the unsupervised loss term determined at each of the plurality of output steps.

2. The cross-training network of claim 1, wherein the unsupervised loss term comprises a contrastive loss term.

3. The cross-training network of claim 1, wherein:
   the unsupervised subnetwork is further configured to, at each of the plurality of output steps, determine a distance-based loss term between parameters of the unsupervised audio encoder and parameters of the supervised audio encoder; and
   updating the parameters of the speech recognition model is further based on the distance-based loss term determined at each of the plurality of output steps.

4. The cross-training network of claim 3, wherein the distance-based loss term comprises an L2 loss.

5. The cross-training network of claim 3, wherein updating the parameters of the speech recognition model based on the unsupervised loss term occurs jointly with updating the parameters of the speech recognition model based on the distance-based loss term.

6. The cross-training network of claim 1, further comprising a supervised subnetwork trained on a plurality of labeled audio samples corresponding to spoken utterances paired with corresponding transcriptions, the supervised subnetwork configured to:
   at each of the plurality of output steps for each labeled audio sample:
      generate, using the speech recognition model, a corresponding speech recognition result for the labeled audio sample; and
      determine a supervised loss term based on the corresponding speech recognition result for the labeled audio sample and the corresponding transcription of the labeled audio sample; and
   update the parameters of the speech recognition model based on the supervised loss term determined at each of the plurality of output steps for each labeled audio sample in the plurality of labeled audio samples.

7. The cross-training network of claim 6, wherein the corresponding speech recognition result generated for the labeled audio sample using the speech recognition model comprises a probability distribution over possible speech recognition hypotheses for the labeled audio sample at the corresponding output step.

8. The cross-training network of claim 6, wherein the supervised subnetwork is further configured to update the parameters of the speech recognition model based on the supervised loss term jointly with the unsupervised network updating the parameters of the speech recognition model based on the unsupervised loss term and a distance-based loss term.

9. The cross-training network of claim 1, wherein the target branch is further configured to apply a stop gradient operation on the predicted higher order feature representation for the corresponding augmented acoustic frame.

10. The cross-training network of claim 1, wherein the parameters of the unsupervised audio encoder and the parameters of the supervised audio encoder are initialized with the same initial parameters.

11. The cross-training network of claim 1, wherein the parameters of the unsupervised audio encoder and the parameters of the supervised audio encoder are initialized with different initial parameters.

12. The cross-training network of claim 1, wherein each of the unsupervised audio encoder and the supervised audio encoder comprise at least one of:
   a respective full-context encoder; or
   a respective cascaded encoder.

13. A computer-implemented method when executed on data processing hardware causes the data processing hardware to perform operations comprising:
   receiving a sequence of acoustic frames extracted from unlabeled audio samples corresponding to spoken utterances not paired with corresponding transcriptions;
   at a target branch of a cross-training network, at a plurality of output steps, generating, using a supervised audio encoder of a speech recognition model, a target higher order feature representation for a corresponding acoustic frame in the sequence of acoustic frames;

at an augmentation branch of the cross-training network:
  augmenting the sequence of acoustic frames extracted from the unlabeled audio samples by masking one or more acoustic frames in the sequence of acoustic frames; and
  at each of the plurality of output steps, generating, as output from an unsupervised audio encoder of the speech recognition model, a predicted higher order feature representation for a corresponding augmented acoustic frame in the sequence of augmented acoustic frames;
at each of the plurality of output steps, determining an unsupervised loss term based on the target higher order feature representation generated by the target branch at the corresponding output step and the predicted higher order feature representation generated by the augmented branch at the corresponding output step; and
updating parameters of the speech recognition model based on the unsupervised loss term determined at each of the plurality of output steps.

14. The computer-implemented method of claim 13, wherein the unsupervised loss term includes a contrastive loss term.

15. The computer-implemented method of claim 13, wherein the operations further comprise:
  at each of the plurality of output steps, determining a distance-based loss term between parameters of the unsupervised audio encoder and parameters of the supervised audio encoder; and
  updating parameters of the speech recognition model is further based on the distance-based loss term determined at each of the plurality of output steps.

16. The computer-implemented method of claim 15, wherein the distance-based loss term comprises an L2 loss.

17. The computer-implemented method of claim 15, wherein the updating parameters of the speech recognition model based on the unsupervised loss term occurs jointly with updating the parameters of the speech recognition model based on the distance-based loss term.

18. The computer-implemented method of claim 13, wherein the operations further comprise:
  receiving a plurality of labeled audio samples corresponding to spoken utterances paired with corresponding transcriptions;
  at each of the plurality of output steps for each labeled audio sample:
    generating, using the speech recognition model, a corresponding speech recognition result for the labeled audio sample; and
    determining a supervised loss term based on the corresponding speech recognition result for the labeled audio sample and the corresponding transcription of the labeled audio sample; and
  updating the parameters of the speech recognition model based on the supervised loss term determined at each of the plurality of output steps for each labeled audio sample in the plurality of labeled audio samples.

19. The computer-implemented method of claim 18, wherein the corresponding speech recognition result generated for the labeled audio sample using the speech recognition model includes a probability distribution over possible speech recognition hypotheses for the labeled audio sample at the corresponding output step.

20. The computer-implemented method of claim 18, wherein updating parameters of the speech recognition model based on the supervised loss term occurs jointly with updating parameters of the speech recognition model based on the unsupervised loss terms and a distance-based loss term.

21. The computer-implemented method of claim 13, wherein the operations further comprise applying a stop gradient operation on the predicted higher order feature representation for the corresponding augmented acoustic frame.

22. The computer-implemented method of claim 13, wherein the parameters of the unsupervised audio encoder and the parameters of the supervised audio encoder are initialized with the same initial parameters.

23. The computer-implemented method of claim 13, wherein the parameters of the unsupervised audio encoder and the parameters of the supervised audio encoder are initialized with different initial parameters.

24. The computer-implemented method of claim 13, wherein each of the unsupervised audio encoder and the supervised audio encoder comprise at least one of:
  a respective full-context encoder; or
  a respective cascaded encoder.

* * * * *